United States Patent Office 2,764,497
Patented Sept. 25, 1956

2,764,497

RESINOUS PRODUCTS PLASTICIZED WITH EPOXIDIZED LONG CHAIN POLYBASIC ACID ESTERS

Thomas F. Mika, Orinda, and Robert D. Sullivan, Concord, Calif., assignors to Shell Development Company, New York, N. Y., a corporation of Delaware No Drawing. Application January 24, 1955,
Serial No. 483,797

13 Claims. (Cl. 106—176)

This invention relates to plasticized resinous compositions, and more particularly, to thermoplastic resinous compositions plasticized with a special group of long chain epoxidized polycarboxylic acid esters.

Specifically, the invention provides new and particularly useful compositions comprising a resinous material, and particularly a polymer of an unsaturated monomer or a cellulose ether or ester, plasticized with an ester of an epoxy containing polycarboxylic acid obtained by treating a polyethylenically unsaturated polycarboxylic acid having a chain of at least 16 carbon atoms with terminal carboxyl groups and having at least two ethylenic groups which are non-conjugated and are at least three carbon atoms removed from the carboxyl groups with an epoxidizing agent so as to convert at least one and preferably all of the ethylenic groups to

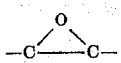

groups.

Resinous materials, such as vinyl polymers and cellulose derivatives, generally form brittle products and it is necessary to add a plasticizing agent thereto. Materials that have been used for this purpose include dioctyl phthalate, dibutyl phthalate and tricresyl phosphate. While these materials give improved flexibility, they possess certain defects which have placed a considerable limitation on their general all around application in this field. Many of these plasticizing agents, for example, are quite volatile and are readily lost from the plasticized composition through evaporation or migration. In addition, these plasticizing agents endow the thermoplastic resinous compositions with flexibility at normal temperatures, but when the temperature is lowered below about —15° C., the compositions again become brittle and are easily cracked. Furthermore, compositions containing the conventional plasticizing agents have poor thermal stability, i. e., when they are exposed to high temperatures they lose their strength and are discolored.

It is, therefore, an object of the invention to provide improved plasticized resinous compositions. It is a further object to provide plasticized resinous compositions that have very low volatility ratings, i. e., fail to lose the plasticizer through volatilization. It is a further object to provide plasticized resinous compositions having outstanding low temperature flexibility. It is a further object to provide plasticized resinous compositions which have excellent thermal stability. It is a further object to provide compositions plasticized with epoxidized esters which do not deteriorate after short periods of use. It is a further object to provide improved plasticized vinyl halide polymers and improved plasticized cellulose ethers and esters. It is still a further object to provide improved vinyl resin plastisol and organosol compositions. Other objects and advantages of the invention will be apparent from the following detailed description thereof.

It has now been discovered that these and other objects may be accomplished by employing as the plasticizing agent for the resinous material an ester of an epoxy containing acid obtained by treating a polyethylenically unsaturated polycarboxylic acid having a chain of at least 16 carbon atoms with terminal carboxyl groups and having at least two ethylenic groups which are in non-conjugated relationship and at least three carbon atoms removed from the carboxyl groups with an epoxidizing agent so as to convert one and preferably all of the ethylenic groups to

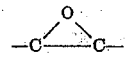

groups. These special esters have been found to have unexpected properties which make them particularly outstanding as general all around plasticizing agents for resinous materials. These esters are, for example, highly compatible with the resinous products in a wide variety of proportions and when used, even in relatively small quantities, endow the resulting compositions with superior properties. Compositions containing the above-described esters have unexpectedly low volatility ratings and can be exposed to air for extended periods of time without loss of plasticizer through volatilization or through migration. In addition, compositions containing these esters have excellent low temperature flexibility and can be exposed to low temperatures, e. g., —50° C. without losing their flexibility. The compositions containing the above-noted esters also display an unexpected improvement in thermal stability. These compositions can be exposed to high temperatures for very long periods of time without any great loss in strength or without too great a discoloration.

The esters of the above-described epoxidized acids are especially outstanding as plasticizer for the thermoplastic resinous materials such as vinyl halide polymers as they have exceptionally good compatibility characteristics and, unlike other epoxidized products, retain that compatibility even after long periods of exposure to heat and light.

The above-described esters are also useful in the preparation of improved plastisol and organosol compositions. When combined with the finely-divided polymers alone or in combination with known plasticizing materials, such as dioctyl phthalate, and/or coating solvents, they form fluid mixtures that can easily be spread on cloth or metal panels and on heating fuze together to form excellent plastic sheets. They are particularly suited for this application because of their low volatility.

Further advantage in using the above-described esters as plasticizers for resinous materials that are formed as calendered sheets or plastisol or organosol compositions is also found in the fact that, if desired, these esters may be cured while in combination with the thermoplastic materials through the epoxy and/or ethylenic group or groups as described hereinafter to form much tougher and harder products which, however, still possess the desired degree of flexibility.

The discovery that these particular esters may be used as superior plasticizers for resinous materials was quite unexpected in view of the poor results obtained heretofore with derivatives of the long chain saturated polycarboxylic acids. Esters of such acids, for example, have very limited compatibility with the thermoplastic resins and give compositions having poor flexibility and thermostability.

The acids, esters of which are provided by the present invention, include those obtained by epoxidizing the polyethylenically unsaturated polycarboxylic acids having a chain of at least 16 carbon atoms and having at least two ethylenic groups which are in non-conjugated relationship and are at least three carbon atoms removed from the carboxyl groups. A particularly preferred group of these unsaturated acids include those of the formula

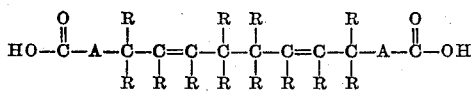

wherein A represents a divalent radical having a chain of 3 to 9 carbon atoms, and R is a member of the group consisting of hydrogen, halogen, nitro, cyano, carboxy $$-\overset{O}{\underset{\|}{C}}OR, \ -O\overset{O}{\underset{\|}{C}}R, \ -OR, \ -SR, \ -SO_2R \text{ and } -R \text{ radicals}$$

wherein R is a hydrocarbon radical containing no more than 8 carbon atoms. Examples of these acids include, among others, 8,12-eicosadiene-1,20-dioic acid, 3,16-dimethyl-8,12-eicosadiene-1,20-dioic acid, 8,12-dimethyl, 8,13-dimethyl, and 9,12-dimethyl-8,12-eicosadiene-1,20-dioic acid, 8,12-diisopropyl-8,12-eicosadiene-1,20-dioic acid, dichloro-7,11-octadecadiene-1,18-dioic acid, 3,16-dimethoxy-7,11-octadecadiene-1,18-dioic acid, 3,16-dinitro-7,11-octadecadiene-1,18-dioic acid, 4,15-dicyano-7,11-octadecadiene-1,18-dioic acid, 9,13-dicosadiene-1,22-dioic acid, 3,17-dibutyl-8,13-docosadiene-1,22-dioic acid, 3,17-dichloro-8,13-docosadiene-1,22-dioic acid, 3,16-dibutylsulfonyl-8,12-eicosadiene-1,20-dioic acids, 10,14-tetracosadiene-1,24-dioic acid, 3,3,4,4-tetramethyl-8,12-eicosadiene-1,20-dioic acid, 3,4,16,17-tetrabutyl-8,12-eicosadiene-1,20-dioic acid, 4,15-dimethyl-8-vinyl-10-octadecene,1,18-dioic acid, 4,15-dibutyl-8-vinyl-10-octadecene-1,18-dioic acid, dimethyl 7-vinyl-9-hexadecene-1,16-dioic acid, dimethyl-8-isopropenyl-10-octadecene-1,18-dioic acid, 8,16-diacetyl-8,12-eicosadiene-1,20-dioic acid, 8,16-diacetoxy-8,12-eicosadiene-1,20-dioic acid, carboethoxy-8,12-eicosadiene-1,20-dioic acid, 3,16-dicarbobutoxy-8,12-eicosadiene-1,20-dioic acid, 3,16-dicarboxy-8,12-eicosadiene-1,20-dioic acid, 3,16-diethylmercapto-7,11-octadecadiene-1,18-dioic acid and the like.

Especially preferred acids to be used in preparing the epoxidized acids include those of the formula

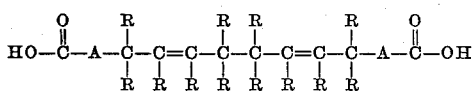

wherein A is a divalent hydrocarbon radical containing a chain of from 3 to 5 carbon atoms between the two valence bonds and having a total of no more than 12 carbon atoms, and R is a member of the group consisting of hydrogen, lower alkyls and chlorine, but preferably no more than 5 R's being chlorine. Still more preferred are the acids of the formula $$(CH_2CH=CH-CH_2(CH_2)_n\overset{O}{\underset{\|}{C}}-OH)_2$$

wherein $n$ is a whole number from 3 to 5. Examples of these preferred acids include, among others, 8,12-eicosadiene-1,20-dioic acid, 3,16-dimethyl-8,12-eicosadiene-1,20-dioic acid, 8,12-dimethyl-8,12-eicosadiene-1,2-dioic acid, 7,11-octadecadiene-1,18-dioic acid and 3,16-dibutyl-7,11-octadecadiene-1,18-dioic acid.

The above-described preferred unsaturated acids to be used in preparing the epoxidized acids are obtained by treating a cyclic peroxide of special structure with compound having a conjugated system of double bonds, such as butadiene and cyclopentadiene, in the presence of a heavy metal capable of existing in several valence forms, such as iron or cobalt. This method of preparation may be exemplified by the following equations showing the preparation of 8,12-eicosadienedioic acid from 1,1-dihydroxydicyclohexyl peroxide (obtained from cyclohexanone and hydrogen peroxide) and butadiene in the presence of ferrous sulfate:

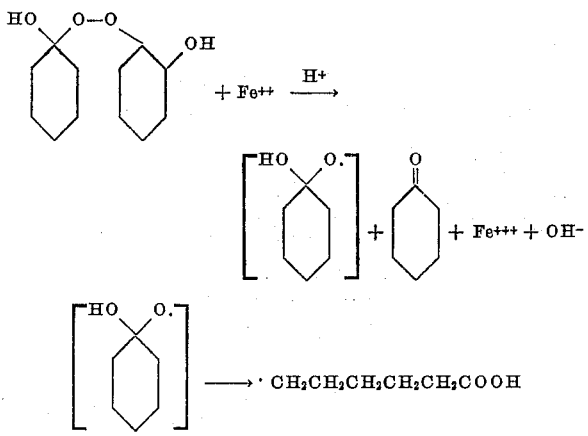

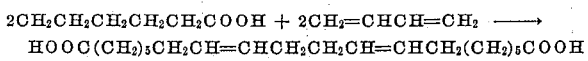

$2CH_2CH_2CH_2CH_2CH_2COOH + 2CH_2=CHCH=CH_2 \longrightarrow$
$HOOC(CH_2)_5CH_2CH=CHCH_2CH_2CH=CHCH_2(CH_2)_5COOH$ The acid produced by the above process also contains minor quantities of other acids, such as $HOOC(CH_2)_5CH_2CH(CH=CH_2)$
$CH_2CH=CHCH_2(CH_2)_5COOH$ Particularly advantageous cyclic peroxides to be used in the process are those represented by the formula

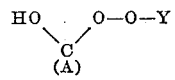

wherein Y is a hydrogen atom, a

radical, or a

radical, and A is a divalent radical containing a chain of no more than 5 carbon atoms between the two free bonds of the radical, and preferably divalent hydrocarbon radicals which may be substituted, if desired, with functional groups, such as hydroxy, nitro, cyano, carboxy, ester, ether and sulfone groups and halogen atoms.

Cyclic peroxide compounds to be used in the above process are preferably obtained by reacting hydrogen peroxide with a cyclic ketone of the formula

wherein A is a divalent radical as described above. These peroxides can be produced as described in Milas, U. S. 2,298,405, the products from equimolar amounts of cyclic ketone and hydrogen peroxide being chiefly the 1-hydroxy-1'-hydroperoxydicycloalkanyl peroxides

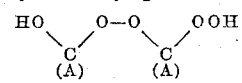

Preferred cyclic peroxides for use in the present process are the 1,1'-dihydroxydicycloalkanyl peroxides

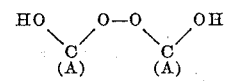

obtainable by the use of two moles of cyclic ketone per mole of hydrogen peroxide.

The A in the above-described formula of the cyclic ketone is preferably unsubstituted methylene groups or methylene groups substituted with methyl, ethyl, propyl, butyl, benzyl, phenyl, cyclohexyl, chloro, bromo, hydroxy, methoxy, keto substituents, and the like. A may also form a part of a phenyl or cyclohexyl ring. Representative examples of such suitable divalent radicals include:

$$-CH_2CH_2CH_2-$$

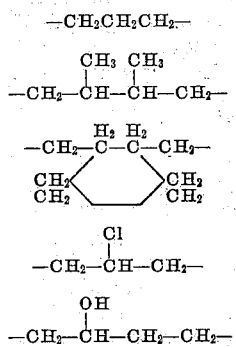

and the like.

Conjugated diethylenic compounds which can be reacted with the above-described cyclic peroxide compounds to produce the polyethylenic carboxylic acids include, among others, the conjugated diolefins, such as those of 4 to 18 carbon atoms as 1,3-butadiene, 1,3-pentadiene, isoprene, dimethyl-1,3-butadiene, 1,3,5-hexatriene, 2-ethyl-1,3-pentadiene, 2,4-octadiene, 1,1-dimethyl-3-tertiary butyl-1,3-butadiene, 2-phenyl-1,3-butadiene, 1,4-diphenyl-1,3-butadiene, 2-benzyl-1,3-butadiene, 2-cyclohexyl-1,3-butadiene, 1,1-diphenyl-3,5-hexadiene, cyclopentadiene, 1,3-cyclohexadiene, 1-methyl-2,4-cyclopentadiene, 2-methyl-1,3-cyclopentadiene, the mono- and dimethyl-1,3-cyclohexadienes, 1-vinyl-1-cyclohexene, 1-tertiary butyl-1,3-cyclohexadiene, and 1,3-cycloheptadiene are typical, and substitution products of such conjugated diolefins having as substituents functional groups such as hydroxy, nitro, cyano, carboxy, ester, ether and sulfone groups or halogen atoms. As halogenated conjugated diethylenic compounds, those containing one or more atoms of fluorine, chlorine and/or bromine are preferred. Representative examples of suitable halogenated conjugated diethylenic starting materials are chloroprene, 2,3-dichloro-1,3-butadiene, 1-chloro-2-methyl-1,3-butadiene, 2-chloro-1,3-pentadiene, 1 - chloro - 2,4 - cyclopentadiene, 1-chloromethyl-2,4-cyclohexadiene and the like. Other substituted conjugated diethylenic compounds which can be used successfully as starting materials are, for example, conjugated diethylenic alcohols such as 2,4-hexadiene-1-ol-1,3-hexadiene-5-ol, 2,4-octadiene-6-ol and 2,4,6-octatriene-1-ol, etc., ethers such as 2-methoxy-1,3-butadiene, 2-ethoxy-1,3-butadiene, 1-ethoxy-2,3-cyclohexadiene, etc., carboxylic acids of which vinyl acrylic acid, sorbic acid (2,4-hexadienoic acid), 4-methyl-2,4-pentadienoic acid, and muconic acid are typical, and esters of such acids, such as the methyl, ethyl, isopropyl, tertiary butyl, 2-ethylhexyl, decyl, and the like. 1-Cyano-1,3-butadiene, 3-nitro-1,3-butadiene, 1 - methylsulfonyl - 1,3 - butadiene, 3-vinyl-3-sulfolene, and the like, are examples of other suitable conjugated diethylenic compounds which may be used in the above-described process.

Preferred compounds having the conjugated system of double bonds to be used in the process are those of the formulae

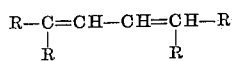

and

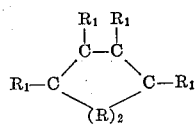

R and $R_1$ are members of the group consisting of hydrogen or hydrocarbon radicals, and preferably aliphatic hydrocarbon radicals containing from 1 to 8 carbon atoms and $R_2$ is a divalent alkylene group containing from 1 to 3 carbon atoms or a substituted derivative thereof which has one or more of the hydrogen atoms replaced by hydrocarbon radicals.

The proportions in which the cyclic peroxide and the compound possessing the conjugated system of double bonds are employed in the reaction may vary over a considerable range. In most cases, the peroxide and the compound possessing the conjugated system of double bonds will be employed in approximately equal molecular amounts, but larger or smaller amounts may be used as desired. Preferably, one mole of the peroxide will be reacted with from 1 to 2 moles of the compound possessing the conjugated system of double bonds.

The heavy metals, such as iron and cobalt, are employed in the reaction in at least equivalent amounts. The expression "equivalent amount" in this regard refers to that amount required for the formation of free radicals from one molecule of peroxide. The heavy metals are preferably employed in amounts varying from 1 to 1.5 equivalents.

In place of the equivalent or excess amounts of the heavy metals, however, one can use smaller amounts of the metals together with a reducing agent which serves to convert the metal ions back to the lower valence form, e. g., ferric ions to ferrous ions, as fast as they are formed. Examples of such reducing agents include 1-ascorbic acid, sodium formaldehyde sulfoxylate, sodium bisulfite, reducing sugars, and the like.

The reaction between the peroxide and the compound possessing the conjugated system of double bonds may be effected in water, solvents or emulsions. The reaction is preferably carried out in the presence of common solvents, such as methanol, ethanol, tertiary butanol, benzene, diethyl ether, methyl acetate, acetone, dioxane, and the like, or mixtures thereof or mixtures of these solvents with water.

Temperatures employed in the reaction between the peroxide and the compound possessing the conjugated system of double bonds may vary over a considerable range, but is generally maintained between about −15° C. to about 60° C. The temperature is preferably maintained between about −10° C. and 25° C. Pressures used may be atmospheric, superatmospheric or subatmospheric. While atmospheric pressure is generally preferred, it may be desirable to operate at higher pressures, such as, for example, when it is desired to maintain relatively volatile solvents in the liquid phase.

The preparation of eicosadienedioic acid is illustrated below.

*Eicosadienedioic acid*

About 50 parts of a 34% hydrogen peroxide solution was added portionwise to 98 parts of cyclohexanone. The temperature was held below 40° C. by intermittent cooling. After completion of the addition, the mixture was allowed to stand at room temperature for an hour.

The 1,1' - dihydroxydicyclohexyl peroxide produced above was then dissolved in 750 parts of methanol containing 25 parts of concentrated sulfuric acid. The solution was cooled to 0° C. and 81 parts (1.5 moles) of butadiene dissolved therein. A solution of 147 parts (0.53 mole) of ferrous sulfate heptahydrate and 25 parts of concentrated sulfuric acid in 250 parts of water was added with stirring to the peroxide solution at 0° C. over a period of 1½ to 2 hours. After completion of the addition, the mixture was warmed to 65° C. and the excess butadiene removed. The mixture was then cooled, diluted with two liters of water and extracted with a 300 part portion of benzene. The benzene solution was dried over anhydrous sodium sulfate and distilled. The benzene and cyclohxanone were removed and then the bottoms boiled with a solution of sodium hydroxide for about three hours. Acidification of the alkaline solution liberated an oily solid which was taken up in benzene, The benzene solution was washed with water, dried and concentrated to a semi-solid residue. Analysis of the residue gave the following values:

|  | Found | Calcd. for $C_{22}H_{38}O_4$ |
| --- | --- | --- |
| Carbon | 70.4 | 70.9. |
| Hydrogen | 10.1 | 10.1. |
| Acidity | 0.59 eq./100 g | 0.59 eq./100 g. |
| Iodine No | 139 eq./100 g | 150 eq./100 g. |
| OH value | 0.006 eq./100 g | 0. |

Recrystallization of the crude acid gave a straight chain isomer having a melting point of 110° C. to 112° C.

Examples of acids obtained by treating the above-described unsaturated acids with an epoxidizing agent, include among others 8,9,12,13-diepoxyeicosanedioic-1,20 acid, 3,16-dimethyl 8,9,12,13-diepoxy-eicosanedioic-1,20 acid, 8,12-diisopropyl-8,9,12,13-diepoxyeicosanedioic-1,2-acid, dichloro - 7,8,11,12-diepoxyoctadecane-1,18 - dioic acid, 3,6 - dinitro - 7,8,11,12 - diepoxyoctadecane - 1,18-dioic acid, 3,17 - dimethoxy-7,8,11,12-diepoxyoctadecane-1,18-dioic acid, 4,15-dicyano - 7,8,11,12-diepoxyoctadecane - 1,18 - dioic acid, 3,4,16,17 - tetramethyl 8,9,12,13-diepoxyeicosanedioic - 1,20 acid, 8,16 - diacetyl - 8,9-epoxy-12, eicosenedioic acid, 8,16 - diacetoxy-8,9,12,13-diepoxyeicosanedioic acid, 10,11,14,15 - diepoxytetracosane - 1,24 - dioic acid, 3,17 - dibutyl-8,9,13,14-diepoxydocosanedioic acid, 3,16 - dibutyl sulfonyl - 8,9,12,13-diepoxyeicosanedioic acid, carboethoxy-8,9,12,13-diepoxyeicosane - 1,2 - dioic acid, 3, 16 - dicarboxy - 8,9,12,13-diepoxyeicosanedioic acid and 3,16 - diethylmercapto-7,8,11,12-diepoxyoctadecane-1,18-dioic acid.

The epoxidized acids are obtained by treating the corresponding ethylenically unsaturated acid with an epoxidizing agent. Organic peracids, such as performic, peracetic acid, perbenzoic acid, monoperphthalic acid and the like, are preferred agents for this reaction. Agents such as performic acid and peracetic acid are usually used in solutions of their carboxylic acids. Thus performic acid may be used, for example, as a 10% to 50% solution of the performic acid in formic acid. These solutions are preferably obtained by adding less than an equivalent amount of $H_2O_2$ to the acid as formic acid. Solid peracids may be used with inert solvents such as benzene, toluene, chloroform and the like.

The amount of the epoxidizing agent employed will vary over a considerable range depending upon the type of products desired. In general, one should employ at least one mole of the oxidizing agent, such as perbenzoic acid, for every ethylenic group to be epoxidized. Thus to produce 8,9,12,13-diepoxyeicosadienedioic acid from 12-eicosadienedioic acid one should react the acid with at least two moles of perbenzoic acid. In some cases, it is rather difficult to effect epoxidation of all of the ethylenic groups and if a completely epoxidized product is required, additional epoxidizing agent and/or long reaction periods may be required.

It is preferred to carry out the epoxidation reaction in a suitable mutual solvent for the reactants and product. Chloroform is an especially useful solvent for the purpose, but other materials, such as ethyl ether, dichloromethane, benzene, ethyl acetate, etc., and the like, may be used. It is not necessary to operate under anhydrous conditions, but the amount of water present should be limited so as to avoid excessive hydrolysis of the epoxy groups. Up to 25% water in the reaction mixture may be tolerated.

The temperature employed during the epoxidation may vary over a considerable range depending upon the type of reactants and oxidizing agents selected. It is generally desirable to maintain the temperature between —20° C. and 60° C., and more preferably, between 10° C. and 40° C. Atmospheric, superatmospheric, or subatmospheric pressures may be employed as desired.

The epoxidized products obtained by this method may be recovered from the reaction mixture by any convenient means known to the art, such as distillation, extraction, fractional precipitation and the like.

The preparation of an epoxidized acid is illustrated by the following experiment on the preparation of epoxidized 8,12-eicosadienedioic acid.

*Epoxidized 8,12-eicosadienedioic acid*

About 100 parts of eicosadienedioic acid, which was prepared as shown above, was added to 1000 parts of chloroform. 380 parts of a 27% peracetic acid solution was then added to the mixture and the resulting mixture allowed to stand at 0° C. to 10° C. for a few days. The product was then washed with ice water, cold 20% sodium hydroxide, ice water and then filtered through sodium sulfate. Chloroform was then taken off and the product concentrated to yield the diepoxidized acid.

The alcohols used in the preparation of the esters of the above-described acids are monohydric alcohols and preferably the aliphatic and cycloaliphatic monohydric alcohols containing no more than 12 carbon atoms, such as, for example, methanol, ethanol, butanol, isobutanol, hexanol, 2-ethylhexanol, 3,5,5-trimethylhexanol, octanol, decanol, dodecanol, 3,4,5-triethylhexanol, cyclohexanol, 3-methylcyclohexanol, allyl alcohol, 2-butenol, 3,4-hexadienol, cyclohexenol, cyclopentenol, 3-thiahexanol, 4-thiaoctanol, 3-oxaheptanol, 3,5-dithiaoctanol, allyloxybutanol, vinyloxyheptanol, chlorobutanol and dichloroctanol.

Particularly preferred alcohols to be used in preparing the ester plasticizers comprise the saturated aliphatic and cycloaliphatic monohydric alcohols containing no more than 8 carbon atoms, and especially the alkanols and cycloalkanols containing up to 6 carbon atoms.

Examples of the esters of the epoxy acids which may be used as plasticizers according to the present invention include, among others, dimethyl 8,9,12,13-diepoxyeicosanedioate-1,20, diamyl 3,16-dimethyl 8,9,12,13-diepoxyeicosanedioate-1,20, diisopropyl 3,16-dinitro-7,8,11,12-diepoxyoctadecanedioate - 1,18, dioctyl 4,15 - dicyano-7,8,11,12 - diepoxyeicosanedioate - 1,20, dibutyl 8,16 - diacetyl - 8,9 - epoxy - 12 - eicosenedioate - 1,20, dioctyl 7,8,11,12-diepoxyoctadecanedioate-1,18, diallyl 8,9,12,13-diepoxyeicosanedioate - 1,20, dimethyl 3,17 - dibutyl-8,9,13,14 - diepoxydocosanedioate - 1,20, diamyl carboethoxy - 8,9,12,13 - diepoxyeicosanedioate - 1,20, dimethyl dichloro - 7,8 - epoxyoctadecene - 11 - dioate - 1,18, dibutyl 3,16-dicarboxy-8,9,12,13 - diepoxyeicosanedioate-1,20, dimethyl 34,16,17 - tetramethyl - 8,9,12,13 - diepoxyeicosanedioate-1,20 and di(2-ethylhexyl) 8,9,12,13-diepoxyeicosanedioate-1,20.

The esters may be prepared by a variety of method. They may be prepared, for example, by direct esterification of the above-described acids with the alcohols. This is preferably accomplished by heating the acid and alcohol in the presence of catalyst and removing the water formed during the reaction by distillation.

Catalysts may be used in the direct esterification process if desired but their presence is not essential. Suitable catalysts that may be used comprise hydrochloric acid, sulfuric acid, p-toluene sulfonic acid, ethyl sulfonic acid, hydrobromic acid, chloroacetic acid, sulfuric acid, benzene sulfonic acid, formic acid, boron and silicon fluorides, acid salts, such as mono-sodium and mono-potassium sulfates, and salts of strong acids and weak bases, such as aluminum sulfate, zinc chloride, zinc sulfate, and the like. The amount of the catalyst employed will vary over a wide range depending upon the particular reactants, catalyst, and reaction conditions employed. In most cases, the amount of catalyst will vary between 0.1% to 5% by weight of reactants. Preferred amounts of catalyst to be employed in the esterification process vary between 0.5% to 2% by weight of reactants.

The amount of the acid and alcohol to be added to the reaction mixture may vary over a considerable range. As all carboyl groups are to be esterified it is preferred to react the acid with at least an equivalent amount of the alcohol. The equivalent ratios of alcohol to acid preferably vary between 1.1:1 and 1.5:1. The exact proportions of acids and alcohol to be used, however, may best be determined for each individual case.

The esterification may be accomplished in the presence or absence of solvents or diluents. In case the solvents or diluents are desired, inert organic compounds, such as benzene, toluene, cyclohexanone, and xylene, which do not interfere with the reaction may be used.

The temperature employed during the esterification may vary over a considerable range depending upon the type of reactants and catalysts to be employed. In most cases the temperature will range between about 40° C. to 250° C. with a preferred range being between 60° C. and 150° C.

The esters of the epoxy acids may, and preferably are in many cases, prepared by reacting the corresponding unsaturated acid with the desired alcohol and then treating the resulting ester with an epoxidizing agent as described hereinabove for the preparation of the epoxidized acids.

The esters of the unsaturated acids used in this reaction are preferably prepared by the method described above for the preparation of the unsaturated acids themselves. The esters may, for example, be prepared by the above-described method by employing the desired alcohol as the solvent or by a related method wherein an ether-substituted cyclic peroxide such as those of the formula

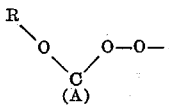
(A)

wherein R is a hydrocarbon or substituted hydrocarbon radical, is used as the cyclic peroxide, or still further by reacting the acid as produced with the desired alcohol in the presence of a suitable esterification catalyst. The preparation of the dimethyl ester of eicosadienedioic acid is illustrated below:

A-Dimethyl eicosadienedioate 1,1'-Dihydroxydicyclohexyl peroxide was prepared as shown in the above-described preparation of eicosadienedioic acid. The 1,1'-dihydroxydicyclohexyl peroxide was then dissolved in 750 parts of methanol containing 25 parts of concentrated sulfuric acid. The solution was cooled to 0° C. and 81 parts of butadiene then added. A solution of 147 parts of ferrous sulfate heptahydrate, 25 parts of concentrated sulfuric acid and 250 parts of water was slowly added to this mixture at 0° C. After completion of the addition, the mixture was warmed to 65° C. and the excess butadiene collected. The mixture was then cooled, diluted with water and extracted with benzene. The benzene solution was dried and distilled. After removal of benzene and cyclohexanone, the bottoms were dissolved in 300 parts of methanol containing 3 parts of p-toluenesulfonic acid catalyst and the mixture refluxed. After dilution with water and extraction with benzene, the benzene solution was washed and distilled to yield a viscous liquid having a B. P. 190° C. to 220° C. (1 mm.). Analysis of the residue gave the following values: Found C 71.6, H 10.3, ester value 0.53 eq/100 g; Calculated C 72.1, H 10.4, ester value 0.54 eq/100 g. Further analysis showed the product to be a mixture of about 80% dimethyl 8,12-eicosadiene-1,20 dioate and the remainder dimethyl 8-vinyl-10-octadecene-1,18-dioate.

Dimethyl octadecadienedioate is produced by a replaced method wherein the 1,1'-dihydroxydicyclohexyl peroxide is replaced by 1,1'-dihydroxy-dicyclopentyl peroxide.

B-dimethyl dimethyl-8,12-eicosadiene-1,20-dioate

Using isoprene instead of butadiene under the conditions of the above process, good yields of the dimethyl esters of isomeric $C_{22}$ diethylenic dicarboxylic acids, of which about 80% to 85% were the esters of dimethyl-8,12-eicosadiene-1,20-dioic acids having the methyl groups in the 8,12- the 8, -3- and the 9, 12-positions, was obtained. The remaining acids were 8, 10 and 8,11-dimethyl-8-vinyl-10-octadecene-1,18-dioic acids and 10 and 11-methyl-8-isopropenyl-10-octadecene-1,18-dioic acids.

C-dimethyl dichloro-8,12-eicosadiene-1,20-dioate

When chloroprene was used as the conjugated diethylenic compound in the above process, the recovered product was a mixture of dimethyl esters of dichloro-8,12-eicosadiene-1,20-dioic acids, the indications being that no branched chain acids were formed.

D-dimethyl 7,11-octadecadiene-1,18-dioate

Cyclopentanone peroxide produced by reacting cyclopentanone and hydrogen peroxide in a mole ratio of 2:1, reacted in methanol solution with butadiene (3 moles per mole of peroxide) at —10° C. to —5° C. in the presence of 1.1 moles of ferrous sulfate per mole of peroxide, gives in the presence of an esterification catalyst dimethyl 7,11-octadecadiene-1,18-dioate together with a small amount of dimethyl 7-vinyl-9-hexadecene-1,16-dioate. Calc. for dimethyl ester $C_{20}H_{34}O_4$: C, 71.0: H, 10.1; ester value, 0.59 eq./100 g.; Iodine No., 150 g./100 g. Found: C, 71.0: H, 10.1; ester value 0.59 eq./100 g.; Iodine No., 152 g./100 g.

D-dimethyl dimethyl-7,11-octadecadiene-1,18-dioate

By reacting isoprene with cyclopentanone peroxide under the conditions indicated in the preceding preparation, dimethyl esters of the corresponding dimethyl dicarboxylic acids of 20 carbon atoms are produced in good yield.

F-dimethyl dichloro-7,11-octadecene-1,18-dioate

On substituting chloroprene for butadiene in the preparation of dimethyl 7,11-octadecadiene-1,18-dioate as described above, the product is substantially solely the dimethyl ester of dichloro-7,11-octadecene-1,18-dioic acid.

G-dimethyl dimethyl-8,12-eicosadiene-1,20-dioate

The peroxide derived by reacting 4-methylcyclohexanone with hydrogen peroxide gives, in reaction with butadiene under the conditions shown for preparing dimethyl eicosadienedioate, a yield of dimethyl esters of about 55% based on the amount of hydrogen peroxide used. These esters yield, on hydrolysis, 4,17-dimethyl-8,12-eicosadiene-1,20-dioic acid, and about one-sixth as much 4,15-dimethyl-8-vinyl-10-octadecene-1,18-dioic acid is obtained.

H-mixture of dimethyl dimethyl-8,12-eicosadiene-1,20-dioate

A mixture of 112 g. each of 3- and 4-methylcyclohexanones was dissolved in 1500 ml. of methanol containing 50 g. of concentrated sulfuric acid. To this was added 110 g. of 31% hydrogen peroxide with little or no heat effect being observed. After standing at room temperature for two hours, the mixture was charged to a reaction kettle of 3 liter capacity and treated at 0° C. with 124 g. of butadiene. There was next added at 0° C. over 2 hours a solution of 292 g. of ferrous sulfate heptahydrate in 550 g. of water containing 50 g. of sulfuric acid. The excess butadiene and methylcyclohexanones were removed by distillation leaving 150 g. of bottoms. The bottoms were esterified with methanol by refluxing in the presence of p-toluenesulfonic acid and then distilled to recover 105 g. of an ester boiling 180–230° C. at 1 mm. From this fraction was obtained a mixture of isomeric dimethyl esters of chiefly 3, 4- 3, 17-, 4,17- and 4,18-dimethyl 8,12-eicosadiene-1,20-dioic acid.

*I-mixture of diethyl tetramethyl-8,12-eicosadiene-1,20-dioates*

The preceding experiment was repeated with the exception that isoprene was added instead of butadiene. The bottoms product was then reacted with ethanol in the presence of p-toluenesulfonic acid to give a fraction having a B. P. 190–220° C. at 1 mm. This fraction was identified as a mixture of esters of tetramethyl-8,12-eicosadiene-1,20-dioic acid having the four methyl groups in the 3- or 4-, 8- or 9-, 12- or 13-, and 17- or 18-positions.

The epoxidation of the above-described unsaturated esters is accomplished in the same manner as described above for the epoxidation of the unsaturated acids. The preparation of the epoxy esters by this method is illustrated below.

*Epoxidized dimethyl 8,12-eicosadienedioate-1,20*

About 100 parts of dimethyl 8,12-eicosadienedioate-1,20 was added to 1000 parts of chloroform. 400 parts of a 27% peracetic acid solution was then added to the mixture and the resulting product allowed to stand at 0° C. to 10° C. for a few days. The product was then washed with ice water, cold 20% sodium hydroxide, ice water and then filtered through sodium sulfate. Chloroform was then taken off and the product concentrated to a colorless oil. Analysis of the oil indicated that it was epoxidized dimethyl eicosadienedioate wherein both of the ethylenic groups had been converted to epoxy groups. Calc. for $C_{22}H_{38}O_6$ C 66.3 and H —9.6; found C 66.6 and H 9.6.

An ester having related properties is obtained by replacing the dimethyl ester with dibutyl 8,12-eicosadienedioate-1,20.

*Epoxidized dimethyl dimethyl-8,12-eicosadienedioate-1,20*

About 100 parts of the mixture of dimethyl dimethyl-8,12-eicosadiene-dioate-1,20 esters prepared as shown in preparation B above are added to 1000 parts of chloroform. 450 parts of a 27% peracetic acid solution was then added to the mixture and the resulting product allowed to stand at 0° C. for several days. The product was then washed as in the preceding preparation and the chloroform taken off. The resulting product is a colorless oil identified as a mixture of epoxidized dimethyl dimethyl-8,12-eicosadienedioate-1,20 esters wherein both of the ethylene groups are converted to epoxy groups.

*Epoxidized dimethyl dichloro-8,12-eicosadienedioate-1,20*

About 100 parts of the dimethyl ester of dichloro-8,12-eicosadienedioic acids as prepared in C above are added to 1000 parts of chloroform. 450 parts of a 27% peracetic acid solution is then added to the mixture and the resulting product allowed to stand at 0° C. for several days. The product is then washed and treated as shown above and the chloroform removed by distillation. The resulting product is a colorless heavy oil identified as a mixture of epoxidized dimethyl esters of dichloro-8,12-eicosadienedioic acids wherein both of the ethylenic groups are converted to epoxy groups.

*Epoxidized dimethyl 7,11-octadecadiene-1,18-dioate*

Epoxidized dimethyl 7,11-octadecadiene-1,18-dioate, a heavy slightly yellow oil, is obtained by treating 100 parts of the dimethyl 7,11-octadecadiene-1,18-dioate as prepared in preparation D above with 380 parts of a 27% peracetic acid solution by the same method as shown for the preparation of the above epoxidized esters.

An ester having related properties is obtained by replacing the dimethyl ester with diethyl 7,11-octadecadiene-1,18-dioate.

*Epoxidized mixture of diethyl tetramethyl-8,12-eicosadiene-1,2-dioates*

A mixture of the epoxidized diethyl tetramethyl-8,12-eicosadiene-1,20-dioates, a colorless viscous oil, is obtained by treating 100 parts of the mixture of the diethyl esters shown in preparation I above with 400 parts of a 27% peracetic acid solution by the same method as shown for the preparation of the above-described epoxidized esters.

*Epoxidized mixture of dimethyl dimethyl-8,12-eicosadienedioate-1,20*

This mixture of epoxidized esters is obtained by treating 100 parts of a mixture of the unsaturated esters shown in preparation H above with 450 parts of a 27% peracetic acid solution by the same method as shown above for the preparation of the other epoxidized esters.

The materials to be plasticized with the above-described esters include the resinous materials, such as rubbers, esters, the linear polyamides and polyesters, polymers of unsaturated monomers and the like. The term "rubber" as used herein embraces both natural rubber and synthetic rubbers, i. e., rubbery polymers of the type which may be vulcanized with sulfur. Representative synthetic rubbery polymers include the butadiene polymers. Butadiene polymers include those polymers having rubber-like properties which are prepared by polymerizing butadiene alone or with one or more other copolymerizable ethylenically unsaturated compounds, such as styrene, methyl methacrylate, 3,4-dichloroalpha-methyl styrene, methyl isopropenyl ketone and acrylonitrile, the butadiene being present in the mixture to the extent of at least 50% of the total polymerizable material. The butadiene-styrene copolymers are manufactured commercially under such names as GR–S 1000, GR–S 1500, GR–S 1600 and the like. The butadiene-acrylonitrile copolymer rubbers are manufactured under such names as "Buna N," "Hycar ORK" and "Chemigum." Other synthetic rubbers include the neoprene rubbers. "Neoprene" is a generic name which is applied to polymers of chloroprene and copolymers of chloroprene with dienes or vinyl compounds in which the chloroprene comprises the predominant monomer. Isobutylene rubbers may also be plasticized according to the present invention. Preferred rubbers to be plasticized include the polymers of at least one compound of the group of conjugated diolefins and chloroprene.

The cellulose ethers and esters that may be plasticized with the above-described esters include, among others, ethyl cellulose, cellulose nitrate, cellulose acetate, cellulose acetate butyrate, cellulose crotonate, cellulose acetobutyrate, cellulose stearate, and cellulose valerate, methyl cellulose, butyl cellulose, gycol cellulose, benzyl cellulose, cellulose acetopropionate and cellulose acetotartarate.

The polymers of unsaturated monomers which may be plasticized with the above-described esters are preferably thermoplastic polymers of monomers containing a single $CH_2=C=$ group, such as styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide, vinylidene fluoride, the vinyl esters of the inorganic acids, such as the halogen acids and hydrocyanic acids, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as methyl vinyl succinate, and vinyl methyl glutarate, the vinyl ethers, such as vinyl ethyl ether and vinyl butyl ether, and the vinyl ketones, such as vinyl butyl ketone, and vinyl ethyl ketone.

A preferred group of polymers to be plasticized are the thermoplastic vinyl halide polymers. Especially preferred are the polymers containing a predominant quantity of the monomeric units as vinyl halide units, such as vinyl chloride, vinyl bromide, vinyl iodide or vinyl fluoride. Particularly preferred polymers are the vinyl chloride polymers having from 80% to 100% vinyl chloride units.

The polymers of the monomers having a single $CH_2=C=$ group may have a variety of molecular weights. The preferred polymers, and this is particularly true when they are to be used in the preparation of plastisols and organosols, are those having a molecular weight as measured by the Staudinger method (Ind. Eng. Chem. Vol. 36, p. 1152 (1936) ), of at least 15,000 and preferably above 20,000. Commercial grades of vinyl chloride polymers having molecular weights between 80,000 and 200,000 are particularly suited for use with the above-described plasticizers.

If the polymers are to be used in the preparation of plastisol and organosol compositions, they should preferably be in a finely-divided state of subdivision. Generally, they should have a size of less than five microns and more particularly a size between 0.1 and 1 micron.

A single ester may be used as the plasticizer or a mixture of two or more of the compounds may be utilized. In addition, the esters may be used as plasticizers in combination with known plasticizing agents, such as dioctyl phthalate, dibutyl phthalate, tricresyl phosphate, and the like.

The amount of the ester to be incorporated with the resinous material may vary over a considerable range depending upon the particular type of resins to be utilized, the intended use of the compounded resin, etc. If the resinous material is to be used to produce calendered sheets or rigid molded articles, the amount of the plasticizer generally will vary from about 20 parts to 150 parts per 100 parts of resin. Preferred amounts vary from 40 to 75 parts per 100 parts of resin. If other types of plasticizing agents are employed, these proportions may be reduced. Generally the amount of the esters of the present invention will vary from 20 to 70 parts and the secondary plasticizer from 50 to 20 parts.

If the resin is to be used in preparing plastisols, the amount of the plasticizer employed will depend upon that required to form a fluid spreadable paste with the resin at normal temperature (e. g., about 20° C.). The resulting composition preferably should have a viscosity not greater than 1000 poises at 20° C. and preferably between 50 and 400. Generally the desired results are obtained by employing from 40 to 120 parts of the plasticizers.

In the case of organosols, the liquid vehicle will contain added solvents, such as xylene, and increased amounts of plasticizer may be tolerated. Preferred amounts of plasticizer in these cases vary from 60 parts to 100 parts per 100 parts of resin. The amount of solvent employed generally varies between 1 to 20 parts and in some cases as high as 30 parts per 100 parts of resin.

The ester plasticizers are preferably employed in combination with antioxidants, such as, for example, phosphites, amines, phenols, and the like. The antioxidants are generally employed in amounts varying from about 0.1% to 3% by weight of the material being stabilized.

Various pigments, colors, fillers and resin stabilizers may also be added to the compositions.

The resin and plasticizer may be compounded by means of conventional equipment such as mills of the heated roll type or internal mixers. The plasticizer and other compounding ingredients, such as fillers and stabilizers, are worked into the resin so that they are thoroughly dispersed therein by means of such equipment, and the resulting composition then molded, calendered, extruded or otherwise formed into articles of the desired shape by conventional procedure.

The plastisol and organosol compositions are prepared by merely mixing the finely-divided resin into a liquid vehicle containing the plasticizer and other desired ingredients. In the case of the organosols the liquid vehicle will also contain the desired solvents, such as xylene, ketones, etc. The mixing may be effected by simple stirring or milling at ordinary temperatures. If desired, a paint or ball mill may be used, but care should be exercised to keep the temperature low as the heat will thicken the spreadable mixture.

In utilizing the plastisol or organosol, it is generally applied to the surface of the article by the usual methods of spreading or dipping, and the applied material is then fused and gelled with heat whereby homogeneity of the liquid vehicle and the polymer is achieved. For this purpose, heating at about 150° C. to 200° C. is usually satisfactory.

To illustrate the manner in which the invention may be carried out, the following examples are given. It is to be understood that the examples are for the purpose of illustration and the invention is not to be regarded as limited to any of the specific compounds or compositions recited therein. Unless otherwise specified, parts disclosed in the examples are parts by weight.

EXAMPLE I

This example illustrates the use of epoxidized dimethyl 8,12-eicosadienedioate-1,20 as a plasticizer for polyvinyl chloride.

100 parts of polyvinyl chloride was combined with 50 parts of epoxidized dimethyl 8,12-eicosadienedioate as produced above and 1 part of lead stearate and 1 part of cadmium naphthenate and the resulting mixture milled on a roll mill at a temperature of 140° C. for 5 minutes and then molded at 160° C. The resulting composition was a homogeneous sheet that had good tensile strength, excellent flexibility even at the low temperatures, low volatility and outstanding thermal stability.

The excellent thermal stability of the composition as compared to a composition containing the same amount of dioctyl phthalate is shown in the following table.

| Test | Plasticizer | | | |
| --- | --- | --- | --- | --- |
| | Above Ester | | Dioctyl Phthalate | |
| | Stiffness | Ex. Coef. | Stiffness | Ex. Coef. |
| Control | 1,070 | 1.1 | 1,720 | 3.9 |
| 30 min.—160° C | 1,050 | 1.4 | 2,005 | 3.9 |
| 60 min.—160° C | 1,125 | 1.5 | 4,045 | 4.7 |
| 90 min.—160° C | 1,220 | 1.7 | 5,880 | 6.1 |
| 120 min.—160° C | 1,240 | 1.7 | 10,900 | 7.5 |
| 180 min.—160° C | 1,605 | 1.9 | 27,000 | 8.4 |

EXAMPLE II

Example II was repeated with the exception that the lead stearate and cadmium naphthenate were eliminated from the mixture. The plasticized sheet in this case also had good tensile strength, excellent flexibility even at the low temperatures, low volatility and very good thermal stability.

The superior thermal stability of the composition as compared to a composition containing the same amount of dioctyl phthalate is shown in the following table.

| Test | Plasticizer | | | |
|---|---|---|---|---|
| | Above Ester | | Dioctyl Phthalate | |
| | Stiffness | Ex. Coef. | Stiffness | Ex. Coef. |
| Control | 1,175 | .77 | 1,450 | 1 |
| 30 min.—160° C | 1,125 | 1.5 | 2,195 | 2.2 |
| 60 min.—160° C | 1,365 | 2.3 | 2,575 | 3.4 |
| 90 min.—160° C | 1,090 | 2.8 | 4,085 | 4.5 |
| 120 min.—160° C | 1,390 | 3.1 | 6,105 | 5.6 |
| 180 min.—160° C | 1,770 | 3.7 | 20,835 | (1) |

[1] Too dark to measure.

The above-described composition containing the epoxidized dimethyl 8,12-eicosadienedioate-1,20 was also superior to a polyvinyl chloride sheet that had been plasticized with an epoxidized triglyceride. The sheet containing the epoxidized triglyceride began to deteriorate after extended exposure to heat and light indicating a growing incompatibility between the resin and plasticizer. The sheet containing the epoxidized dimethyl ester described above, however, showed no such deterioration.

EXAMPLE III

This example illustrates the use of the mixture of epoxidized diethyl tetramethyl-8,12-eicosadienedioates-1,-20 as a plasticizer for polyvinyl chloride.

100 parts of polyvinyl chloride is combined with 50 parts of the mixture of epoxidized diethyl tetramethyl-8,12-eicosadienedioates-1,20 and 1 part of lead stearate and 1 part of cadmium naphthenate and the mixture milled on a roll mill at a temperature of 140° C. for 5 minutes and then molded at 160° C. The resulting composition is a homogeneous sheet that has good tensile strength, excellent flexibility even at low temperatures, low volatility and excellent thermal stability both as to stiffness and as to discoloration. The composition also fails to display any sign of incompatibility after extended exposure to heat and light.

EXAMPLE IV

This example illustrates the use of epoxidized dimethyl 7,11-octadecadiene-1,18-dioate as a plasticizer for a copolymer of vinyl chloride and vinylidene chloride containing 80% vinyl chloride.

100 parts of the above copolymer is combined with 50 parts of epoxidized dimethyl 7,11-octadecadiene-1,18-dioate and 1 part of lead stearate and 1 part of cadmium naphthenate and the mixture milled on a roll mill at a temperature of 140° C. for 5 minutes and then moled at 160° C. The resulting composition is a homogeneous sheet that has good tensile strength, excellent flexibility even at low temperatures, low volatility and excellent thermal stability.

EXAMPLE V

Example IV is repeated with the exception that 50 parts of dimethyl epoxidized dichloro-7,11-octadecadiene-1,18-dioate is used as the plasticizer. The composition obtained in this case also has good strength, excellent flexibility and good thermal stability.

EXAMPLE VI

Example IV is repeated with the exception that 50 parts of the epoxidized diethyl 7,11-octadecadiene-1,18-dioate is used as the plasticizer. The composition obtained in this case also has good strength, excellent flexibility even at low temperatures, low volatility and excellent thermal stability. The composition also fails to display any sign of incompatibility after extended exposure to heat and light.

EXAMPLE VII 100 parts of a copolymer of vinyl chloride and vinyl acetate containing 95% vinyl chloride is combined with 25 parts of epoxidized dibutyl 8,12-eicosadienedioate-1,20 and 25 parts of dioctyl phthalate and the mixture milled on a roll mill at a temperature of 140° C. for 5 minutes and then moled at 160° C. The resulting composition is a homogeneous sheet that has good tensile strength, excellent flexibility and very good thermal stability.

Compositions having related properties are obtained by replacing the epoxidized dibutyl 8,12-eicosadienedioate-1,20 with equal amounts of each of the following: epoxidized dipropyl 7,11-octadecadienedioate, epoxidized diamyl 7,11-octadecadienedioate-1,18 and epoxidized dicyclohexyl 7,11-octadecadienedioate-1,18.

EXAMPLE VIII

This example illustrates the use of epoxidized dimethyl dimethyl-8,12-eicosadienedioate-1,20 as a plasticizer in the preparation of a plastisol of vinyl chloride homopolymer.

100 parts of finely-divided polyvinyl chloride is combined with 60 parts of epoxidized dimethyl dimethyl-8,12-eicosadienedioate and 10 parts of di(2-ethylhexyl) phthalate, 1 part lead stearate and 1 part cadmium naphthenate and the resulting mixture mixed together to form a spreadable fluid paste. The paste is spread on metal panels at a thickness of 8 mils with a doctor blade and the films baked at 177° C. for 5 minutes. At the completion of the baking period, the films are clear homogeneous compositions having good flexibility and excellent thermal stability.

EXAMPLE IX

This example illustrates the use of dimethyl epoxidized 8,12-eicosadienedioate-1,20 as a plasticizer for cellulose derivatives.

Nitrocellulose was added to methyl ethyl ketone to form a solution having 20% solids. The epoxidized dimethyl ester of eicosadienedioic acid was then combined with methyl ethyl ketone to form a solution having 60% solids. Portions of the nitrocellulose solutions were then added to portions of the dimethyl ester solution so as to form compositions having the resin, i. e., the nitrocellulose, and the dimethyl ester in ratios of 9:1, 4:1, 1:1, 1:3 and 1:9. The resulting solutions were then spread on steel panels and air-dried. In all cases, the solutions dried to form clear compatible films. The films prepared from the solutions having the resin and dimethyl ester in ratios of 9L; 4:1 and 1:1 were particularly outstanding as they were hard and had excellent flexibility and thermal stability.

EXAMPLE X

Example IX was repeated with the exception that the solutions were prepared by adding a vinyl chloride-vinyl acetate copolymer to the methyl ethyl ketone to form solutions of 20% and 25% solids and portions of this solution added to the dimethyl ester. In this case the solutions formed compatible films having good flexibility and excellent stability to light and heat.

EXAMPLE XI

This example illustrates the use of dibutyl epoxidized 8,12-eicosadienedioate-1,20 as a plasticizer for GR–S rubber.

100 parts of GR–S rubber stock (containing 23.5 parts styrene and 76.5 parts butadiene) are compounded with 50 parts of fine Furnace Black, 20 parts of dibutyl epoxidized 8,9-eicosadienedioate 1,20, 2.0 parts stearic acid, 5 parts zinc oxide, 1.75 parts of sulfur and 1.0 part of N-cyclohexyl 2-benzothiazole sulfenamide on a two roll mill heated to 70° C. This compounded stock is then cured at 145° C. for 45 minutes to give a rubber having good elasticity and superior low temperature properties.

Rubbers having related properties, particularly as to improved flexibility at low temperatures, may be obtained by replacing the GR–S rubber stock with a butadiene-acrylonitrile rubber stock and a chloroprene rubber stock.

We claim as our invention:

1. A plasticized composition containing a resinous material and as a plasticizer therefor a member of the group consisting of esters of (1) monohydric alcohols of the group consisting of aliphatic and cycloaliphatic monohydric alcohols containing no more than 12 carbon atoms, and (2) epoxidized polyethylenically unsaturated polycarboxylic acids having a chain of at least 16 carbon atoms with terminal carboxyl groups and having at least 2 ethylenic groups which are non-conjugated and are at least 3 carbon atoms removed from the carboxyl groups.

2. A plasticized composition as defined in claim 1 wherein the resinous material is a thermoplastic polymer of a monomer containing a single $CH_2=C=$ group.

3. A plasticized composition as defined in claim 1 wherein the resinous material is a cellulose ester.

4. A plasticized composition containing a thermoplastic polymer of a monomer containing a single $CH_2=C=$ group and a plasticizer therefor consisting of an ester of (1) an aliphatic monohydric alcohol containing no more than 12 carbon atoms and (2) an epoxidized polyethylenically unsaturated polycarboxylic acids of the formula

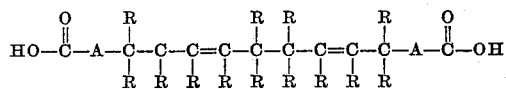

wherein A represents a divalent radical having a chain of 3 to 9 carbon atoms, and R is a member of the group consisting of hydrogen, halogen, nitro, cyano, carboxy,

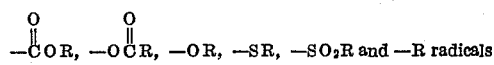

wherein R is an alkyl radical containing no more than 8 carbon atoms.

5. A plasticized composition as defined in claim 4 wherein the polymer is a vinyl chloride polymer containing at least 60% vinyl chloride.

6. A plasticized composition as in claim 4 wherein the thermoplastic resin is a vinyl chloride polymer.

7. A plasticized composition containing a vinyl halide polymer and as a plasticizer therefor a dialkyl ester of epoxidized 8,12-eicosadienedioic acid.

8. A plasticized composition containing a vinyl chloride and as a plasticizer therefor the dimethyl ester of epoxidized 8,12-eicosadienedioic acid-1,20.

9. A plasticized composition containing a vinyl halide polymer and as a plasticizer therefor diethyl ester of epoxidized 8,12-eicosadienedioic acid-1,20.

10. A plasticized composition containing a vinyl halide polymer and as a plasticizer therefor a dimethyl ester of epoxidized 7,11-octadecadienedioic-1,18-acid.

11. A composition comprising a spreadable fluid mixture of a finely-divided vinyl chloride polymer dispersed in a liquid vehicle containing dimethyl ester of epoxidized 8,12-eicosadienedioic acid.

12. A composition comprising a spreadable fluid mixture of a finely-divided vinyl chloride polymer dispersed in a liquid vehicle containing the dimethyl ester of epoxidized 7,11-octadecadienedioic-1,18 acid.

13. A plasticized composition comprising a rubbery polymer of butadiene plasticized with a dialkyl ester of epoxidized 8,12-eicosadienedioic acid.

References Cited in the file of this patent

UNITED STATES PATENTS 2,559,177  Terry et al. _____ July 3, 1951